United States Patent
Tanaka et al.

(10) Patent No.: US 7,310,421 B2
(45) Date of Patent: Dec. 18, 2007

(54) PARTICULAR PLAINTEXT DETECTOR

(75) Inventors: Hidema Tanaka, Koganei (JP);
Toshinobu Kaneko, Noda (JP);
Nobuyuki Sugio, Noda (JP)

(73) Assignee: National Institute of Information and Communications Technology, Tokyo (JP)

(*) Notice: Subject to any disclaimer, the term of this patent is extended or adjusted under 35 U.S.C. 154(b) by 745 days.

(21) Appl. No.: 10/679,879

(22) Filed: Oct. 6, 2003

(65) Prior Publication Data

US 2005/0074117 A1 Apr. 7, 2005

(51) Int. Cl.
*H04K 1/04* (2006.01)
*H04K 1/06* (2006.01)

(52) U.S. Cl. .............................. 380/40; 380/28; 380/42

(58) Field of Classification Search ................. 380/28, 380/40, 42
See application file for complete search history.

(56) References Cited

U.S. PATENT DOCUMENTS

| | | | |
|---|---|---|---|
| 5,444,781 A * | 8/1995 | Lynn et al. ................. 380/46 |
| 5,768,276 A * | 6/1998 | Diachina et al. ............ 370/432 |
| 5,958,073 A * | 9/1999 | White .......................... 714/37 |
| 5,987,124 A * | 11/1999 | Matyas et al. ................ 380/37 |
| 6,005,944 A | 12/1999 | Blaze |
| 6,094,486 A * | 7/2000 | Marchant ..................... 380/52 |
| 6,314,186 B1 | 11/2001 | Lee et al. |
| 6,415,030 B2 | 7/2002 | Matsui et al. |
| 6,775,769 B1 * | 8/2004 | Inada et al. .................. 713/153 |
| 2003/0182435 A1 * | 9/2003 | Redlich et al. ............. 709/229 |

FOREIGN PATENT DOCUMENTS

| | | |
|---|---|---|
| EP | 1 033 405 A2 | 9/2000 |
| WO | WO9967421 A1 | 12/1999 |

OTHER PUBLICATIONS

Kasumi Specification. Specification of the 3GPP Confidentiality and Integrity Algorithms. Version 1.0, Dec. 23, 1999. p. 8-17.*

* cited by examiner

*Primary Examiner*—Kim Vu
*Assistant Examiner*—Randal D Moran

(57) ABSTRACT

An object is to enhance the difficulty in decrypting ciphertext. In order to do input into an encryption algorithm that receives plaintext to output ciphertext, a particular plaintext detector for detecting that the plaintext satisfying a predetermined condition is inputted, the particular plaintext detector includes: a receiving part for receiving the plaintext; a counter part for separating a predetermined part from a bit string forming the plaintext into a fixed part and a remaining part into a variable part, counting the inputted plaintext having a value of the fixed part included in a set of values of the fixed parts at every set of the values of the fixed parts formed of 1 or a plurality of the values of the fixed parts, and storing it as a separate count; and a detecting part for outputting a detection signal when at least one of the separate counts exceeds a predetermined number. The particular plaintext detector is used to receive a detection signal for proper action, which allows the increased difficulty of decryption.

17 Claims, 16 Drawing Sheets

CIPHERTEXT STORING PART

| PARTIAL PLAINTEXT | CIPHERTEXT | KEY REFERENCE INFORMATION |
|---|---|---|
| abc | <binary1> | 1 |
| abc | <binary2> | 1 |
| abc | <binary3> | 1 |
| abd | <binary4> | 1 |
| abd | <binary5> | 2 |

| KEY ID | KEY |
|---|---|
| 1 | 12312312 |
| 2 | 32132132 |

| PLAINTEXT |
|---|
| abcaaaaa |
| abcaaaab |
| abcaaaac |
| abdaaaaa |
| abdaaaab |

<binary1> = Enc(abcaaaaa)
<binary2> = Enc(abcaaaab)
<binary3> = Enc(abcaaaac)
<binary4> = Enc(abdaaaaa)
<binary5> = Enc(abdaaaab)

Enc() INDICATES ENCRYPTION PROCESS
CIPHERTEXT = Enc(PLAINTEXT)

Fig.16

PARTICULAR PLAINTEXT DETECTOR

BACKGROUND OF THE INVENTION

1. Field of the Invention

The present invention relates to a particular plaintext detector.

2. Description of the Related Art

Currently, in order to avoid information leakage or manipulation in transmitting or storing information, information is received as plaintext to utilize an encryption algorithm for encrypting plaintext with a key, and the obtained ciphertext is transmitted or stored. In order to enhance the difficulty in decrypting such ciphertext, it is considered to be important that excellent encryption algorithms are used and that a user keeps a key secret, but plaintext subject to encryption is not traditionally considered to greatly affect the difficulty of decryption. In reality, attention is not given to it particularly. Moreover, it is troublesome to change to new encryption algorithms.

However, the inventor determines that ciphertext can be decrypted easily based on selected plaintext that is the plaintext satisfying certain conditions, depending on encryption algorithms.

Then, the difficulty of decryption can be enhanced without changing encryption algorithms by detecting the event that characteristic plaintext allowed for use in decryption has been inputted before encryption and taking proper schemes.

SUMMARY OF THE INVENTION

More specifically, a bit string of plaintext is separated into a fixed part and a variable part, a set of plaintext formed of the combination of any given value of the fixed part and the entire value of the variable part is used to facilitate decryption. Here, when the fixed part or the variable part is separated into multiple parts, each of them is considered to be formed of virtually continuing bits, thus forming the value of the fixed parts and the value of the variable parts.

Therefore, the number of inputted plaintext having the value of the fixed part is counted to detect that the value of separate counts becomes the maximum value +1 of the value of the variable parts, for example, which tells that decryption becomes easy to take an action such as updating keys.

In addition, it is acceptable to count a set of the values of the fixed parts that the values of a plurality of the fixed parts are combined into one for convenience in reducing the memory required for counting.

Accordingly, a particular plaintext detector for detecting whether plaintext to be inputted into a predetermined encryption algorithm satisfies a predetermined condition, the particular plaintext detector is characterized by including:

a receiving part for receiving the plaintext;

a counter part for separating a predetermined part from a bit string forming the plaintext into a fixed part and a remaining part into a variable part, counting the inputted plaintext having a value of the fixed part included in a set of values of the fixed parts at every set of the values of the fixed parts formed of 1 or a plurality of the values of the fixed parts, and storing it as a separate count; and a detecting part for outputting a detection signal when at least one of the separate counts exceeds a predetermined number. The particular plaintext detector can enhance the difficulty in decrypting ciphertext.

Moreover, this particular plaintext detector is suitable for detecting selected plaintext for use in decrypting ciphertext outputted from a block encryption algorithm that separates plaintext into blocks to execute encryption at every block.

More specifically, a particular plaintext detector is configured to separate 17th to 32nd bits of plaintext from the plaintext into a fixed part and first to 16th bits and 33rd to 64th bits thereof into a variable part and to detect that at least one of separate counts, becomes $2^{48}-1$, for example, for changing keys, which allows the increased difficulty of decryption on KASUMI, one of block encryption algorithms.

More specifically, a filter apparatus for limiting output of ciphertext from an encryption algorithm that receives plaintext to output ciphertext, the filter apparatus includes:

a receiving part for receiving the plaintext;

a counter part for separating a predetermined part from a bit string forming the plaintext into a fixed part and a remaining part into a variable part, counting the inputted plaintext having a value of the fixed part included in a set of values of the fixed parts at every set of the values of the fixed parts formed of 1 or a plurality of the values of the fixed parts, and storing it as a separate count;

a detecting part for outputting a detection signal when at least one of the separate counts exceeds a predetermined number; and a filter apparatus main body for outputting the plaintext when a detection signal is not outputted from the detecting part, and for holding output of the plaintext until it receives a process restart signal for instructing restart of outputting the plaintext when the detection signal is outputted. For example, by routing data outputted from an information processor, which is disposed in a computer network and stores important information, through the filter apparatus, the filter apparatus can detect an attempt that the information processor is being decrypted, thus raising an alert to an operator to take a proper action or taking an action such as automatic discard of held plaintext. Therefore, the difficulty of decryption can be enhanced.

Furthermore, conditions for the plaintext to be detected depend on encryption algorithms. An encryption apparatus with a particular plaintext detector, the encryption apparatus for executing an encryption algorithm that receives plaintext to output ciphertext in which the encryption algorithm is changeable, and an encryption apparatus for executing an encryption algorithm that receives plaintext to output ciphertext in which the encryption algorithm is changeable, the encryption apparatus includes:

a receiving part for receiving the plaintext;

a counter part for separating a predetermined part from a bit string forming the plaintext into a fixed part and a remaining part into a variable part, counting the inputted plaintext having a value of the fixed part included in a set of values of the fixed parts at every set of the values of the fixed parts formed of 1 or a plurality of the values of the fixed parts, and storing it as a separate count;

a detecting part for outputting a detection signal when at least one of the separate counts exceeds a predetermined number;

an encryption apparatus main body for executing the encryption algorithm for encryption when a detection signal is not outputted from the detecting part, and for holding output of the plaintext when the detection signal is outputted;

an indication signal receiving part for receiving an indication signal for indicating an encryption algorithm for new use; and a setting part for outputting cipher setting information required for setting the encryption algorithm executed by the encryption apparatus main body and counter part setting information required for setting information corresponding to the encryption algorithm for the fixed part and the set of the values of the fixed parts and used by the counter part based on the indication signal, wherein the encryption apparatus main body and the counter part perform the settings based on the cipher setting information and the counter part setting information. The encryption apparatus has a plurality of changeable encryption algorithms, and thus it can collectively manage the correspondences between the encryption algorithms and the conditions for plaintext to be detected even when the encryption algorithms used for cryptographic operations are changed frequently. Therefore, the correspondences can be kept easily.

In addition, in the case where it is desired to provide labor savings by automation for taking a faster action, an encryption apparatus for executing an encryption algorithm that receives plaintext to calculate ciphertext with a key, the encryption apparatus includes:

a receiving part for receiving the plaintext;

a counter part for separating a predetermined part from a bit string forming the plaintext into a fixed part and a remaining part into a variable part, counting the inputted plaintext having a value of the fixed part included in a set of values of the fixed parts formed of 1 or a plurality of the values of the fixed parts at every set of the values of the fixed parts, and storing it as a separate count;

a detecting part for outputting a detection signal when at least one of the separate counts exceeds a predetermined number; and an encryption apparatus main body for updating the key used for encryption when a detection signal is outputted from the detecting part. The encryption apparatus is used as a VPN (virtual private network) apparatus to allow accurate updates of keys at the time when decryption becomes easy more than updates of keys for given periods of time. Therefore, the difficulty of decryption can be enhanced, and cryptographic operations holding traffic can be conducted.

Moreover, in the case where the purpose is to encrypt and store data, a ciphertext storing apparatus for executing an encryption algorithm that receives plaintext to calculate ciphertext with a key, and storing the ciphertext, the ciphertext storing apparatus includes:

a receiving part for receiving the plaintext;

a counter part for separating a predetermined part from a bit string forming the plaintext into a fixed part and a remaining part into a variable part, counting the inputted plaintext having a value of the fixed part included in a set of values of the fixed parts at every set of the values of the fixed parts formed of 1 or a plurality of the values of the fixed parts, and storing it as a separate count;

a detecting part for outputting a detection signal when at least one of the separate counts exceeds a predetermined number;

a ciphertext storing part allowed to store ciphertext; and a ciphertext storing apparatus main body for updating the key used for encryption when a detection signal is outputted from the detecting part, and for storing partial plaintext being a part of the plaintext, the ciphertext, and key reference information allowing reference of the key having been used for encryption in the ciphertext storing part. For example, the ciphertext storing apparatus is used as a database management server to allow high-speed search in which ciphertext is narrowed down by utilizing a part of plaintext in searching ciphertext and the narrowed-down ciphertext is decrypted to continue the search. In addition to this, the difficulty of decryption is not reduced because plaintext required for facilitating decryption is not contained in a database.

BRIEF DESCRIPTION OF THE DRAWINGS

The teachings of the invention can be readily understood by considering the following detailed description in conjunction with the accompanying drawings, in which:

FIG. 16 is a diagram illustrating one example of plaintext to be encrypted and stored as ciphertext in a ciphertext storing apparatus of yet another embodiment, a ciphertext storing part having the ciphertext stored, and the relationship between the plaintext and the ciphertext by encryption.

DESCRIPTION OF THE PREFERRED EMBODIMENT

Hereinafter, embodiments of the invention will be described.

This filter apparatus FO is configured to detect that plaintext to facilitate decryption is inputted from the plaintext to be inputted into KASUMI, an encryption algorithm.

Figure 1:
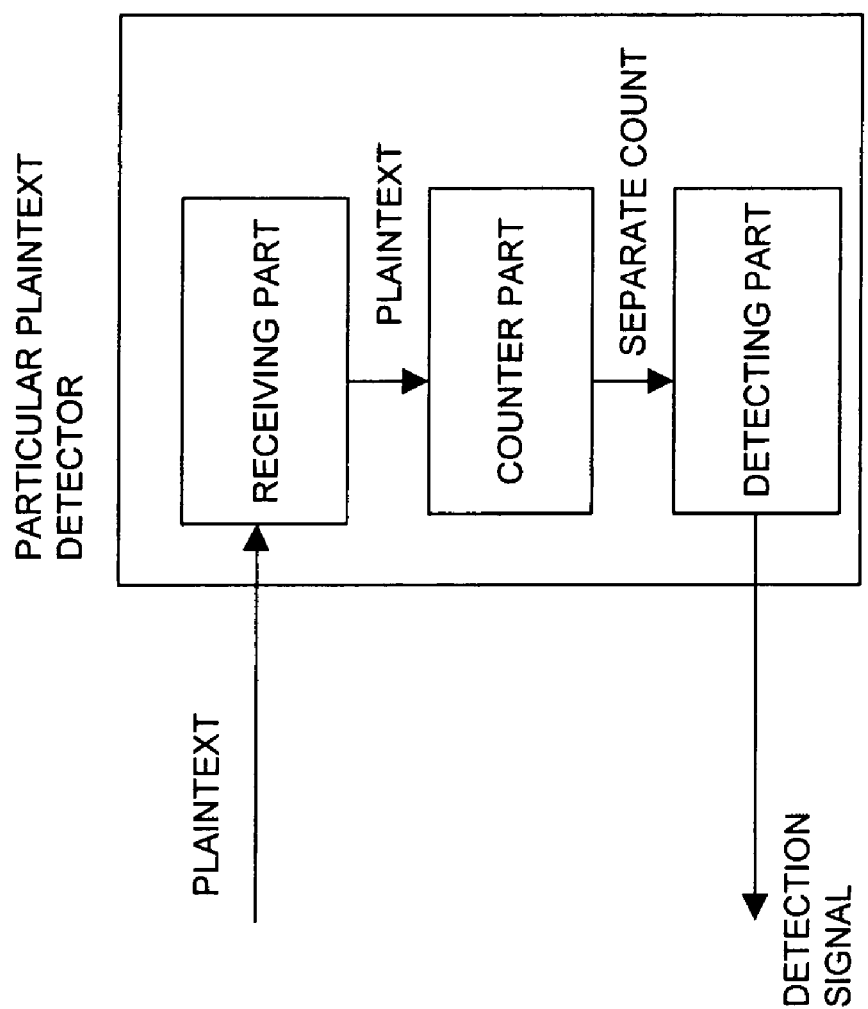
FIG. 1 is a function configuration diagram illustrating the functions relating to claims 1 to 3 according to the invention.
Figure 2:
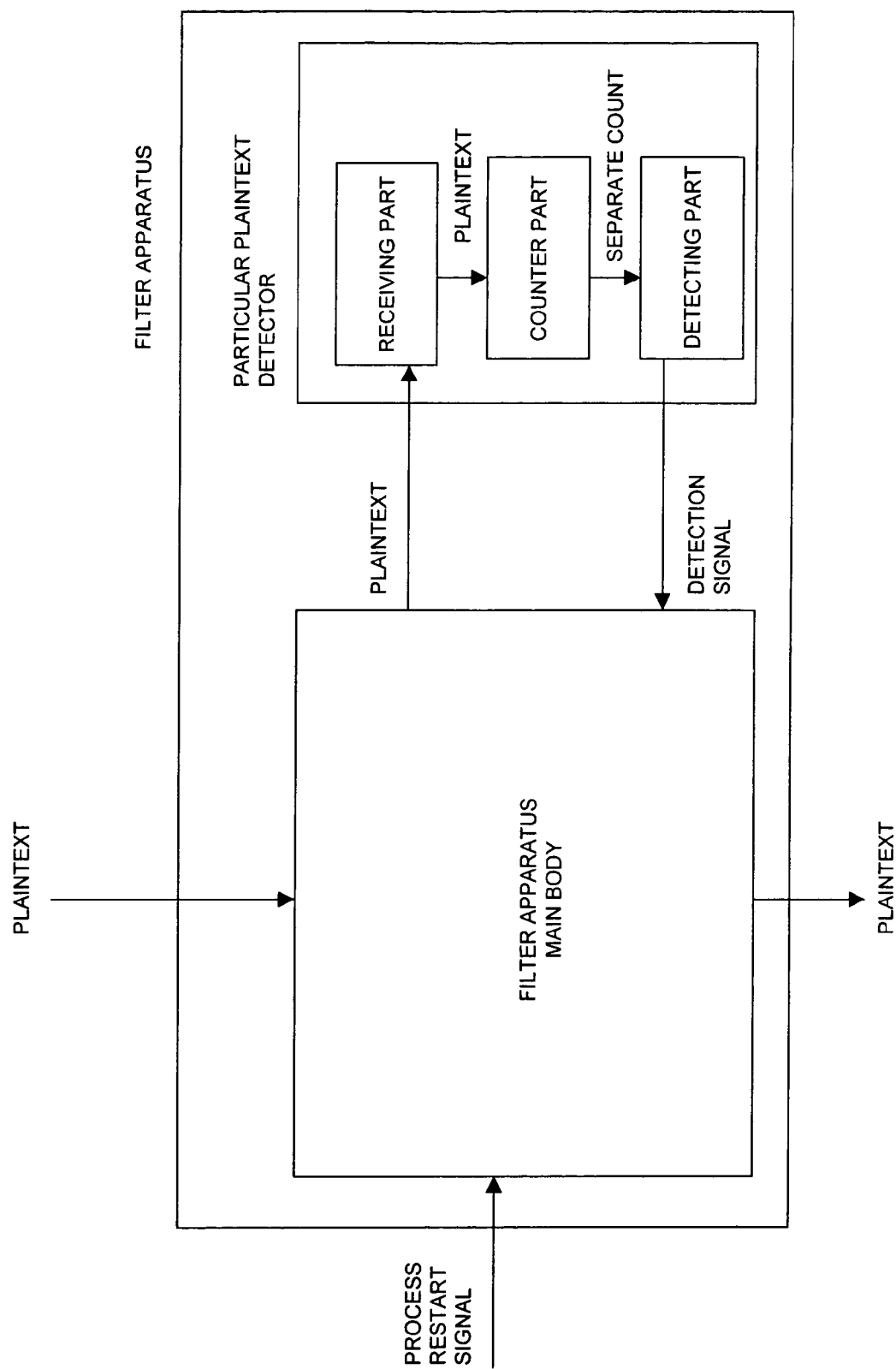
FIG. 2 is a function configuration diagram illustrating the functions relating to claims 4, 8 and 12 according to the invention.
Figure 3:
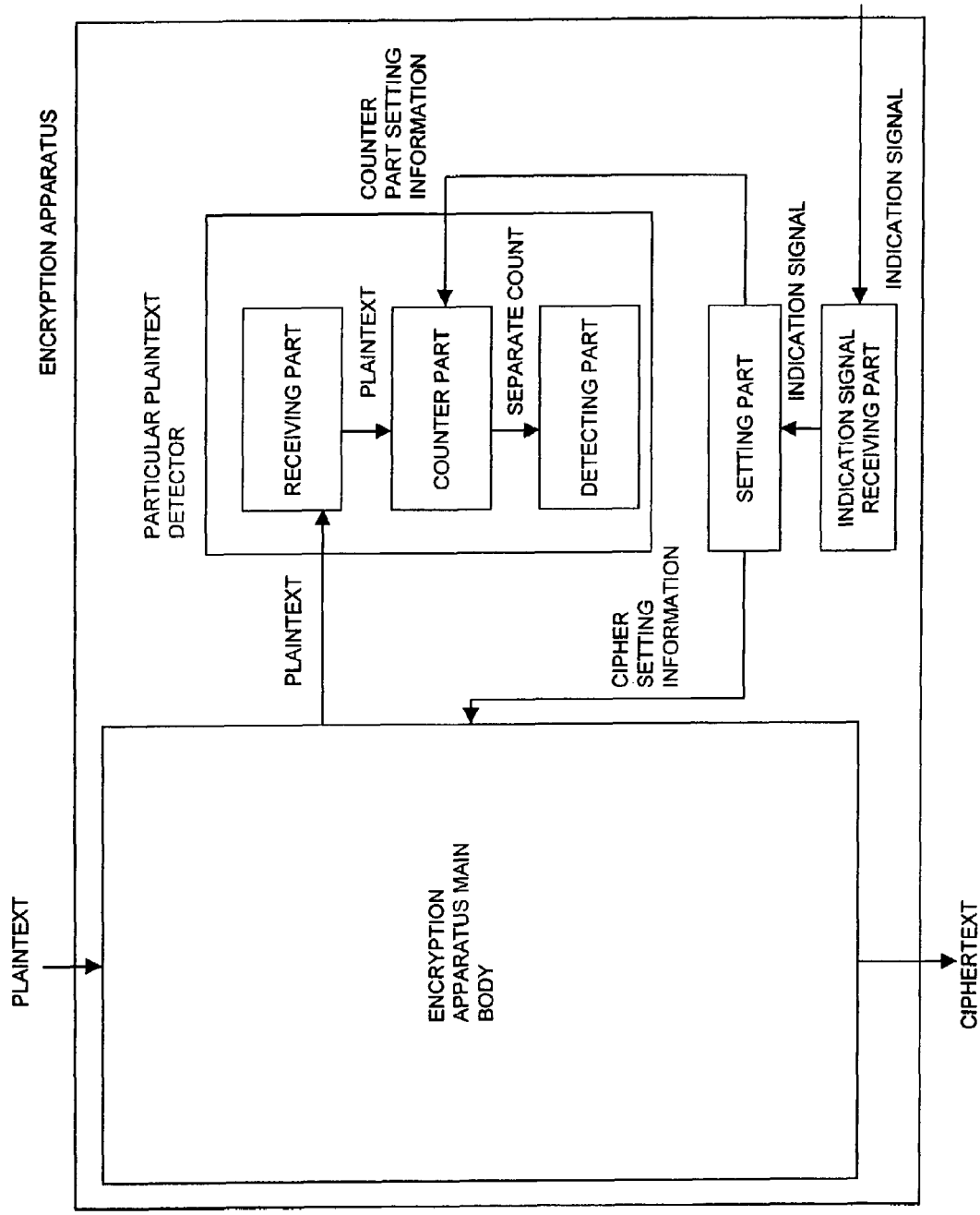
FIG. 3 is a function configuration diagram illustrating the functions relating to claims 5, 9 and 13 according to the invention.
Figure 4:
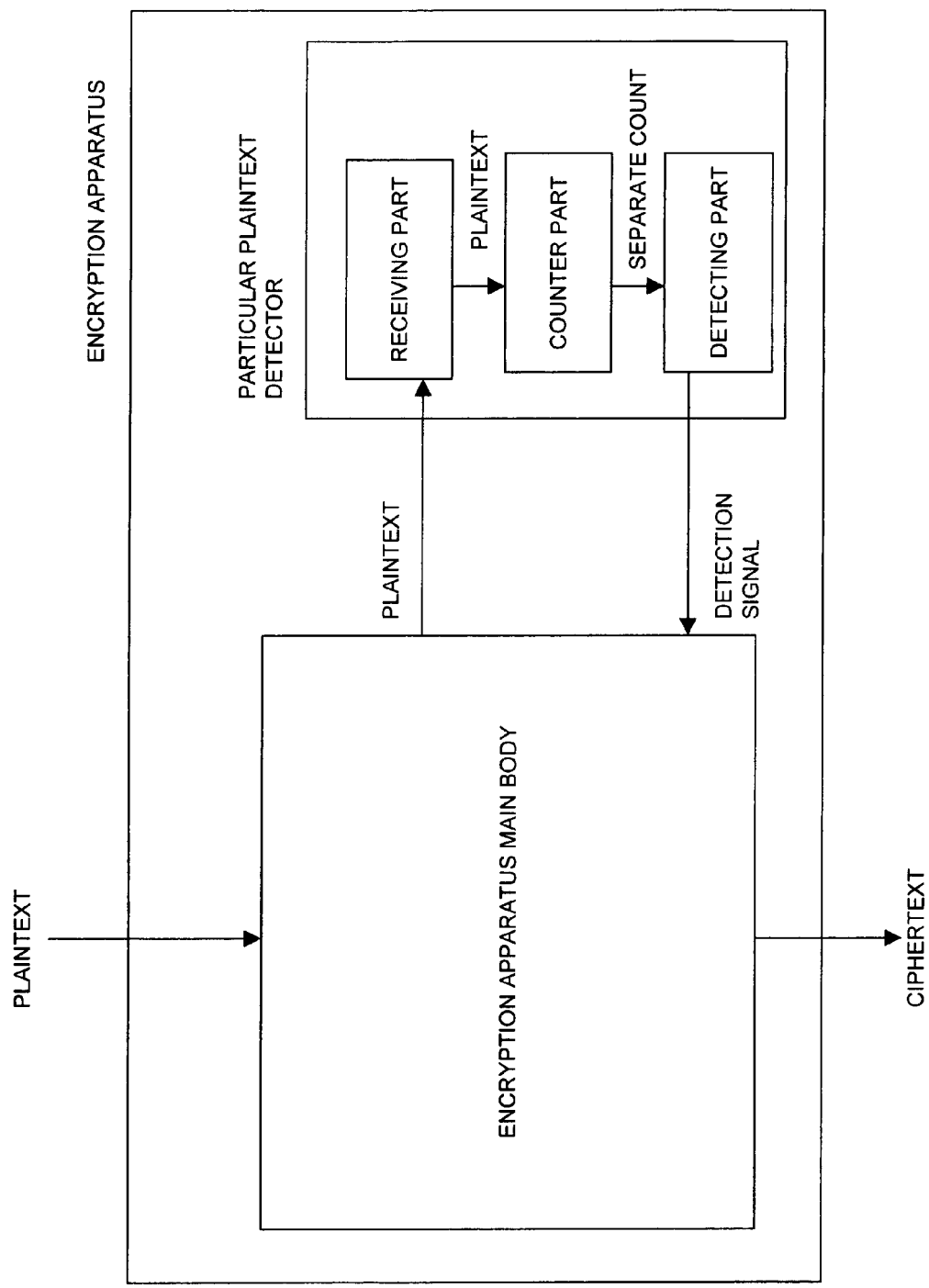
FIG. 4 is a function configuration diagram illustrating the functions relating to claims 6, 10 and 14 according to the invention.
Figure 5:
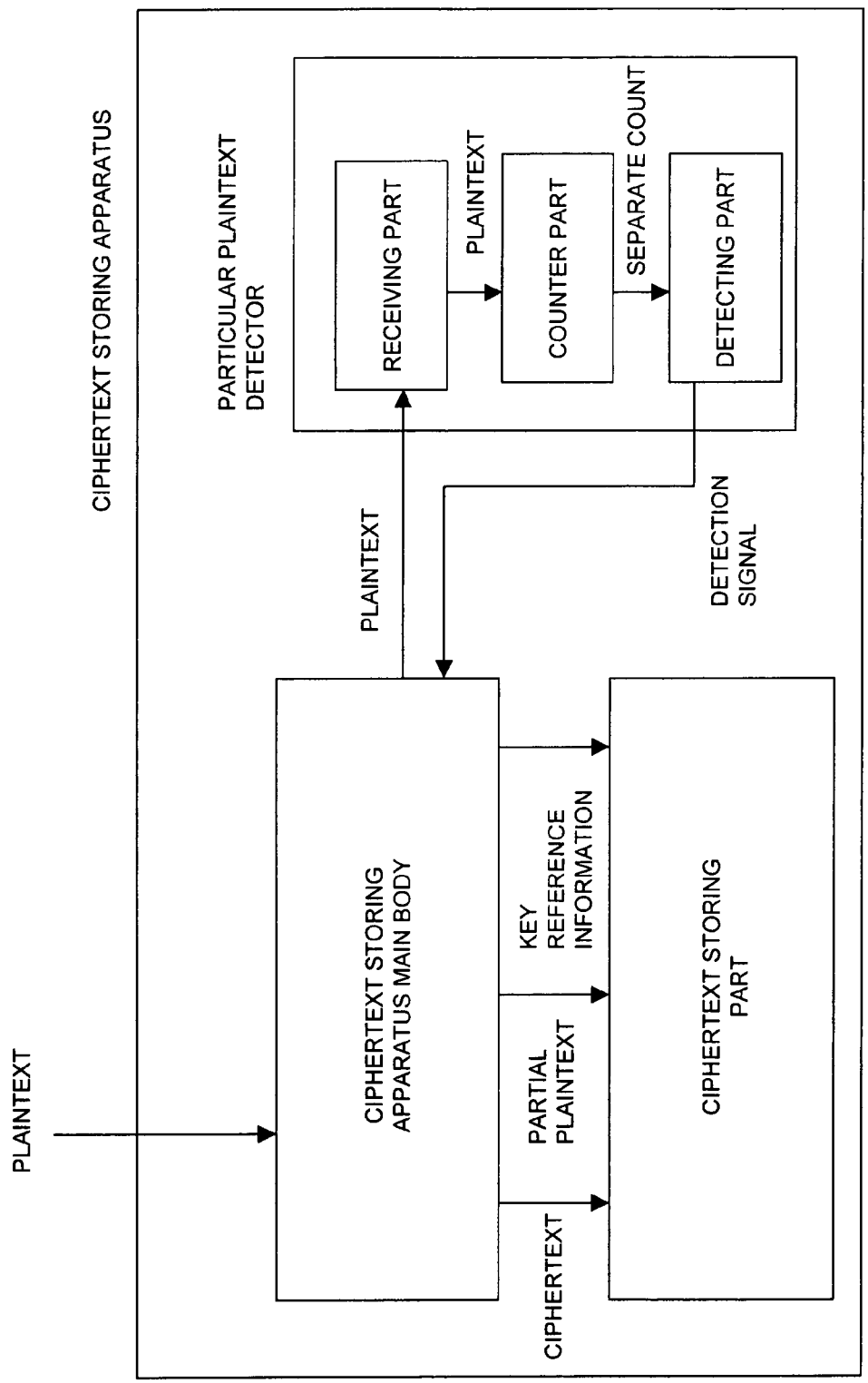
FIG. 5 is a function configuration diagram illustrating the functions relating to claims 7, 11 and 15 according to the invention.
Figure 6:
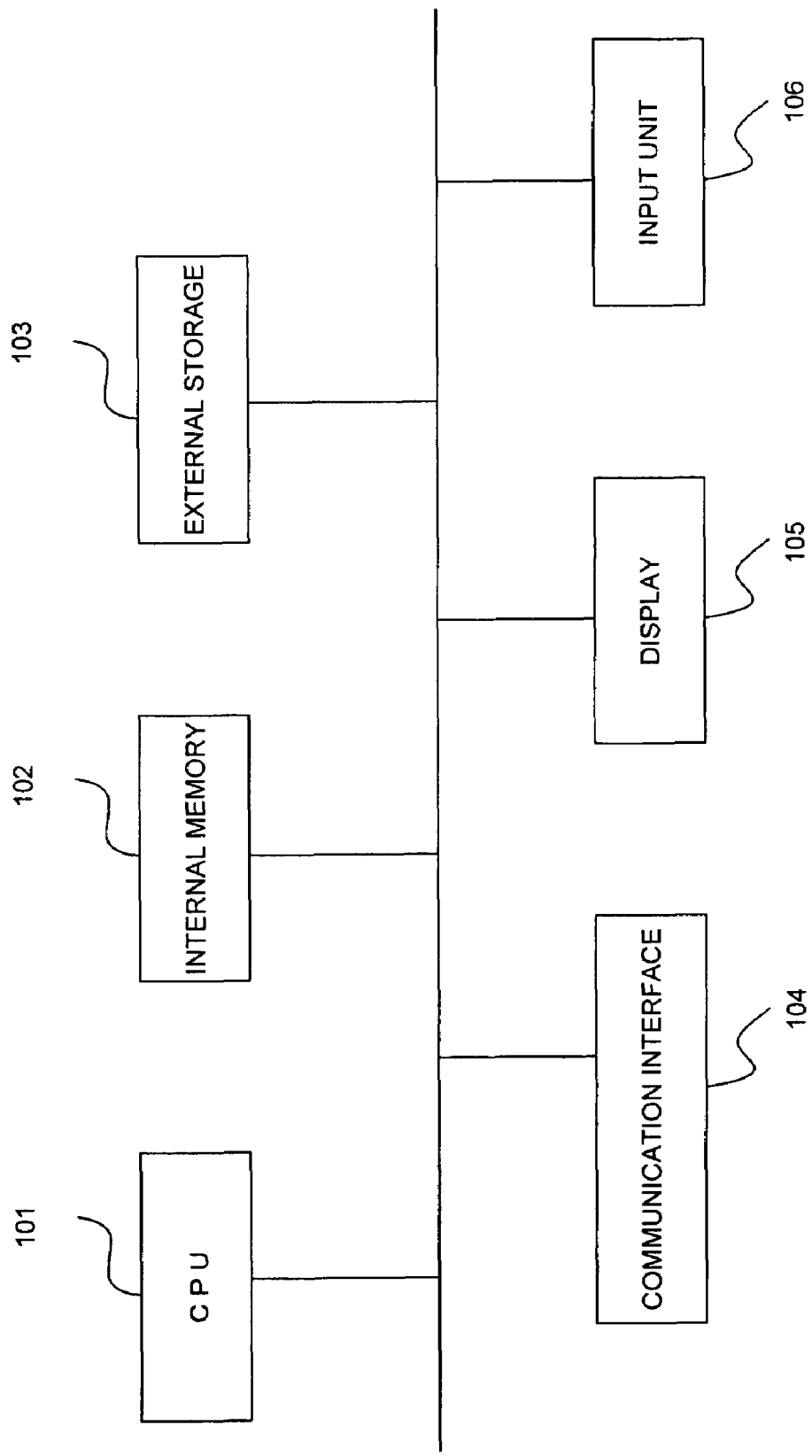
FIG. 6 is a hardware configuration diagram in an embodiment according to the invention.

FIG. 6 is a device configuration diagram illustrating the filter apparatus FO in the embodiment. As shown in FIG. 6, this particular plaintext detector is a general purpose computer, for example, having a CPU 101, an internal memory 102, an external storage 103 such as HDD, a communication interface 104 such as a modem for connecting to communication networks, a display 105, and an input unit 106 such as a mouse and a keyboard.

Figure 7:
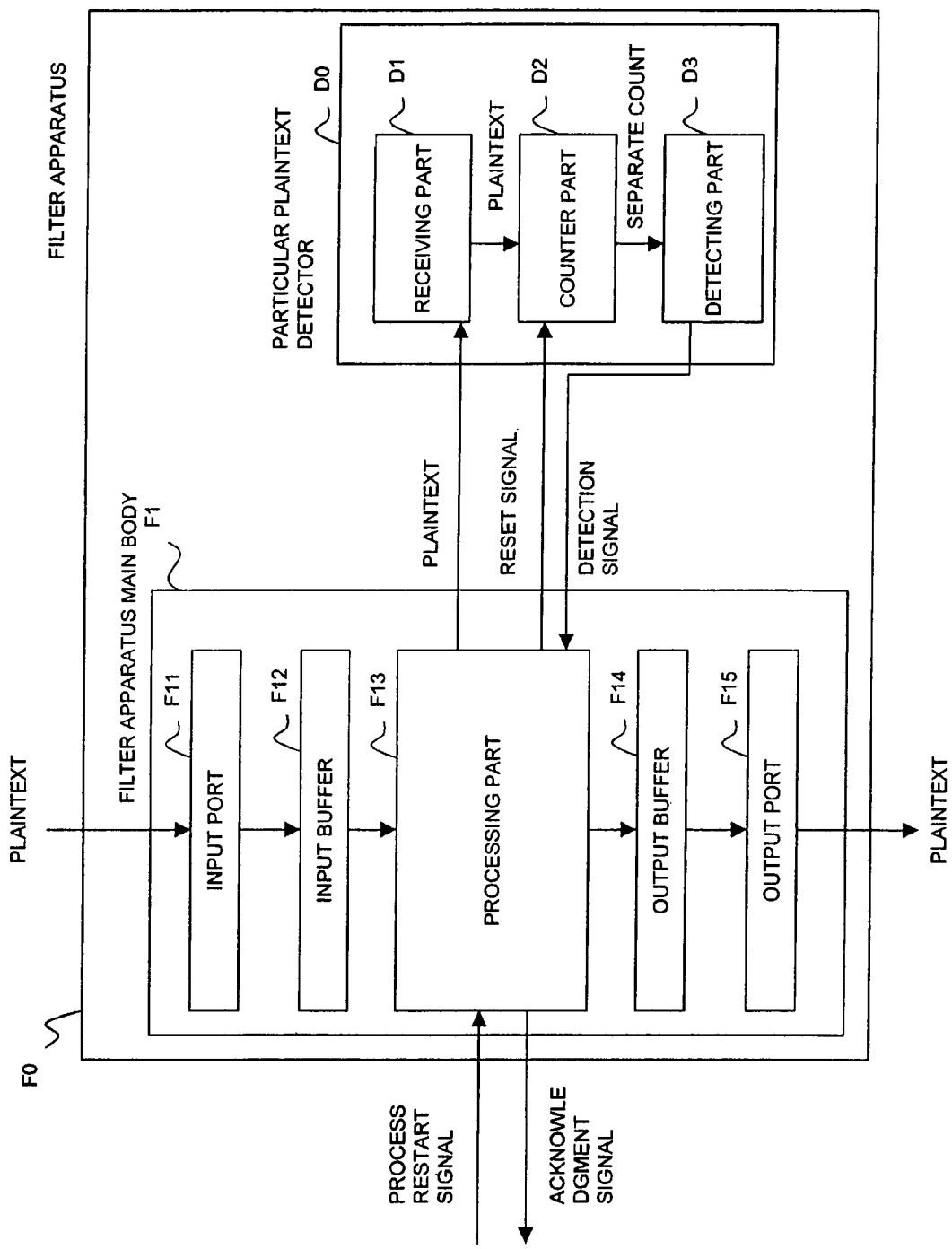
FIG. 7 is a function configuration diagram illustrating a particular plaintext detector in the embodiment.

In the embodiment, as shown in FIG. 7, a predetermined program is installed in the filter apparatus F0, and the CPU 101 and peripheral devices are operated together based on the program, which allows the apparatus to function as a filter apparatus main body F1 and a particular plaintext detector D0.

First, each part will briefly be described below.

The filter apparatus main body F1 has an input port F11 for receiving plaintext, an input buffer F12 for storing the inputted plaintext, a processing part F13 for processing the plaintext in the input buffer F12, an output buffer F14 for storing the plaintext to be outputted, and an output port F15 for outputting the plaintext.

The input port F11 is the port that receives a packet containing plaintext of TCP or UDP.

The input buffer F12 stores the packet received by the input port F11.

The output buffer F14 stores the packet to be outputted as the result processed by the processing part F13.

The output port F15 takes out the packet from the output buffer F14 to alter a part of the header part of the packet and outputs the packet to a network.

The processing part F13 outputs plaintext to the particular plaintext detector D0, receives a detection signal for indicating the detection of particular plaintext and a process restart signal for instructing the restart of processes being suspended, outputs an acknowledgment signal for acknowledging the receipt of the detection signal, and transfers the packet in the input buffer F12 to the output buffer F14.

The particular plaintext detector D0 has a receiving part D1, a counter part D2, and a detecting part D3.

The receiving part D1 receives plaintext.

The counter part D2 separates a predetermined part from a bit string forming the plaintext into a fixed part and the remaining part into a variable part, counts the inputted plaintext having a value of the fixed part included in a set of values of the fixed parts at every set of the values of the fixed parts formed of 1 or a plurality of the values of the fixed parts, and stores it as a separate count.

The detecting part D3 outputs the detection signal when a count exceeds a predetermined value, but it is acceptable to output a non-detecting signal when a count not exceeds a predetermined value instead.

Next, the essential part will be described in detail.

The processing part F13 splits a payload part of the packet being plaintext into 64 bits, and sequentially inputs it into the particular plaintext detector D0. It inputs the entire plaintext contained in a certain packet into the particular plaintext detector D0, and transfers the packet to the output buffer F14 when it does not receive a detection signal.

In addition, the receiving part D1 is configured to receive 64-bit plaintext in accordance with the specifications of KASUMI, a block encryption algorithm that receives and forms plaintext into blocks and receives the blocked plaintext. However, it can be changed in accordance with the specifications of other encryption algorithms.

The counter part D2 is configured to separate 17th to 32nd bits of the plaintext into a fixed part and first to 16th bits and 33rd to 64th bits thereof into a variable part, to count the inputted plaintext having the value of the fixed part included in the set of the values of the fixed parts at every set of the values of the fixed parts formed of at least 1 or a plurality of the values of the fixed parts, and to store it as a separate count. However, the fixed part and the variable part are changeable, and the set of the values of the fixed parts can be set optionally. Furthermore, it has a reset function that resets the entire separate counts to zero when it receives a reset signal.

In addition, the detecting part D3 outputs a detection signal when at least one of the separate counts exceeds a predetermined number.

Figure 8:
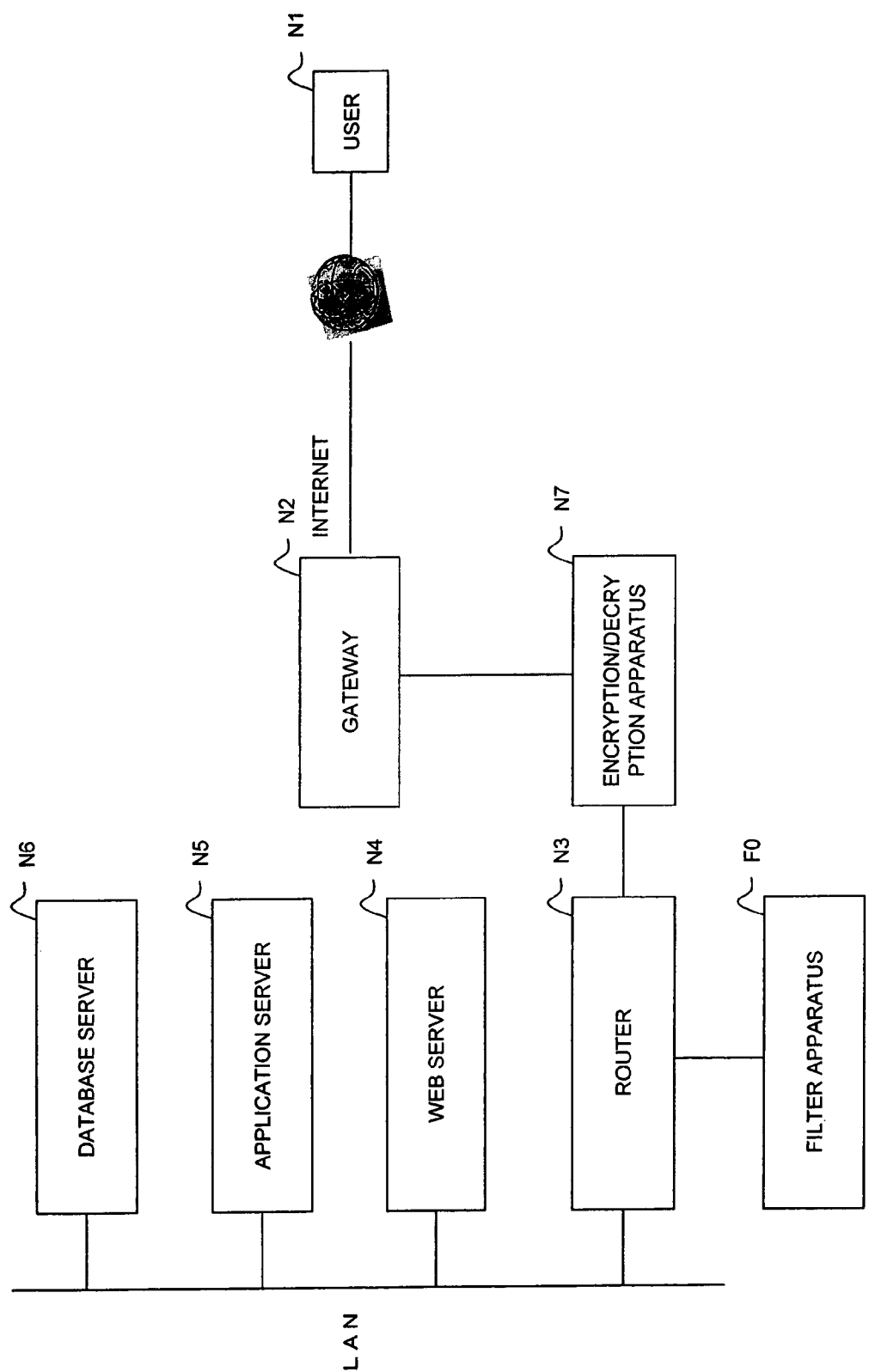
FIG. 8 is a network configuration diagram illustrating a network configuration suitable for using the embodiment.

Next, an example of the operation will be described below, in which the filter apparatus F0 configured as the embodiment is connected to a network as shown in FIG. 8 in order to provide services utilizing the World-wide Web for a user N1 through the Internet.

First, the user N1 sends a request packet making a request for a service to a Web server N4 through the Internet in a state that cryptographic operations are established. The request packet enters a gateway N2 to LAN, it is decrypted by an encryption/decryption apparatus N7, and it is delivered to the Web server N4 through a router N3.

The Web server N4 inquires of an application server N5 and a database server N6 for information, and then creates a response packet to reply the request packet.

The response packet has a header part containing an address that indicates the computer of the user N1 and a payload part containing plaintext that indicates the contents of the response.

The response packet is first delivered to the router N3 based on lower routing information such as an Ethernet.

The router N3 is set beforehand to route the entire packets that are created in the Web server N4 in the LAN and sent to the Internet to the filter apparatus F0, and thus the response packet is delivered to the filter apparatus F0.

Figure 9:
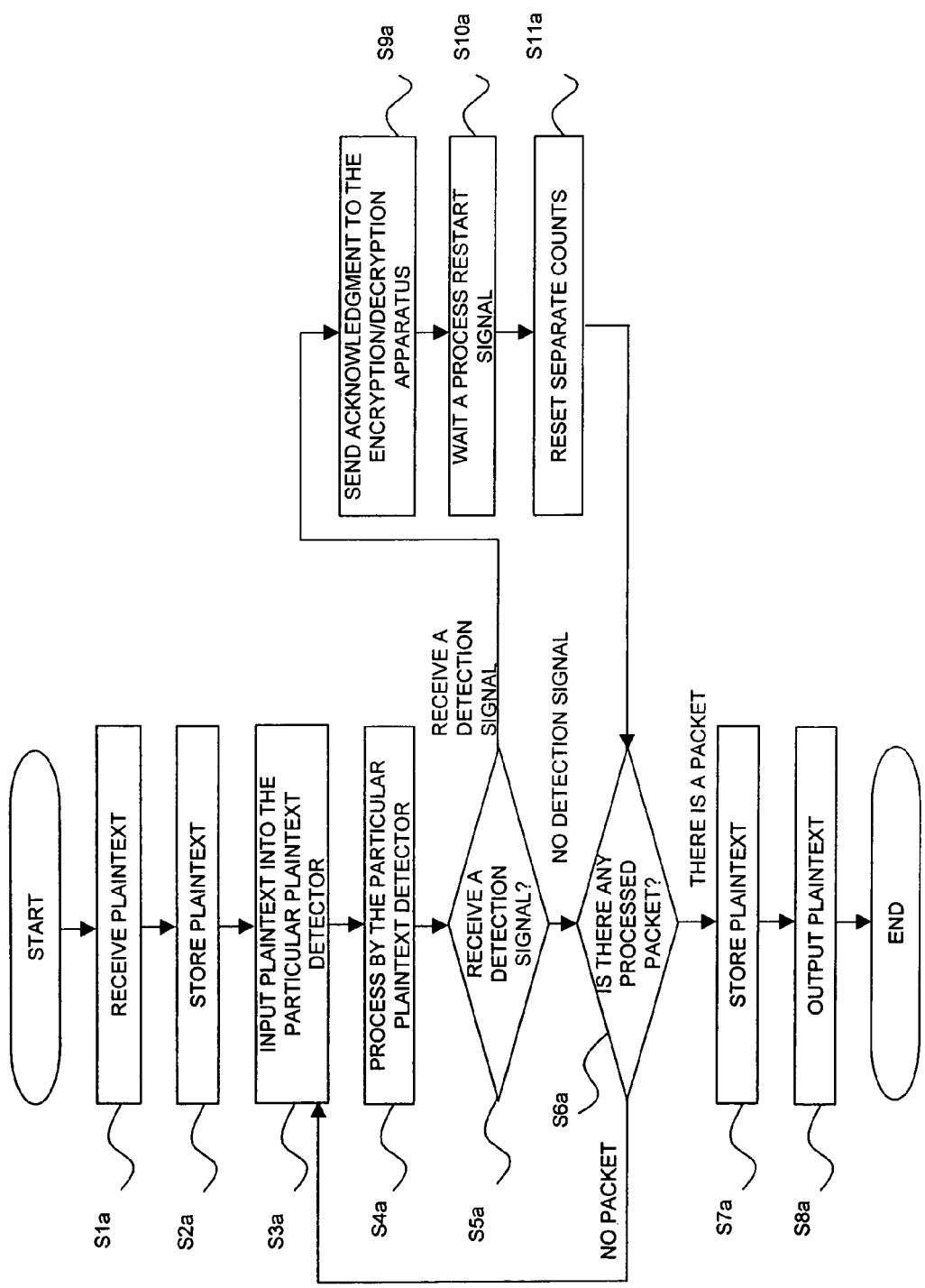
FIG. 9 is a flowchart illustrating an example of the operation of the embodiment.
Figure 10:
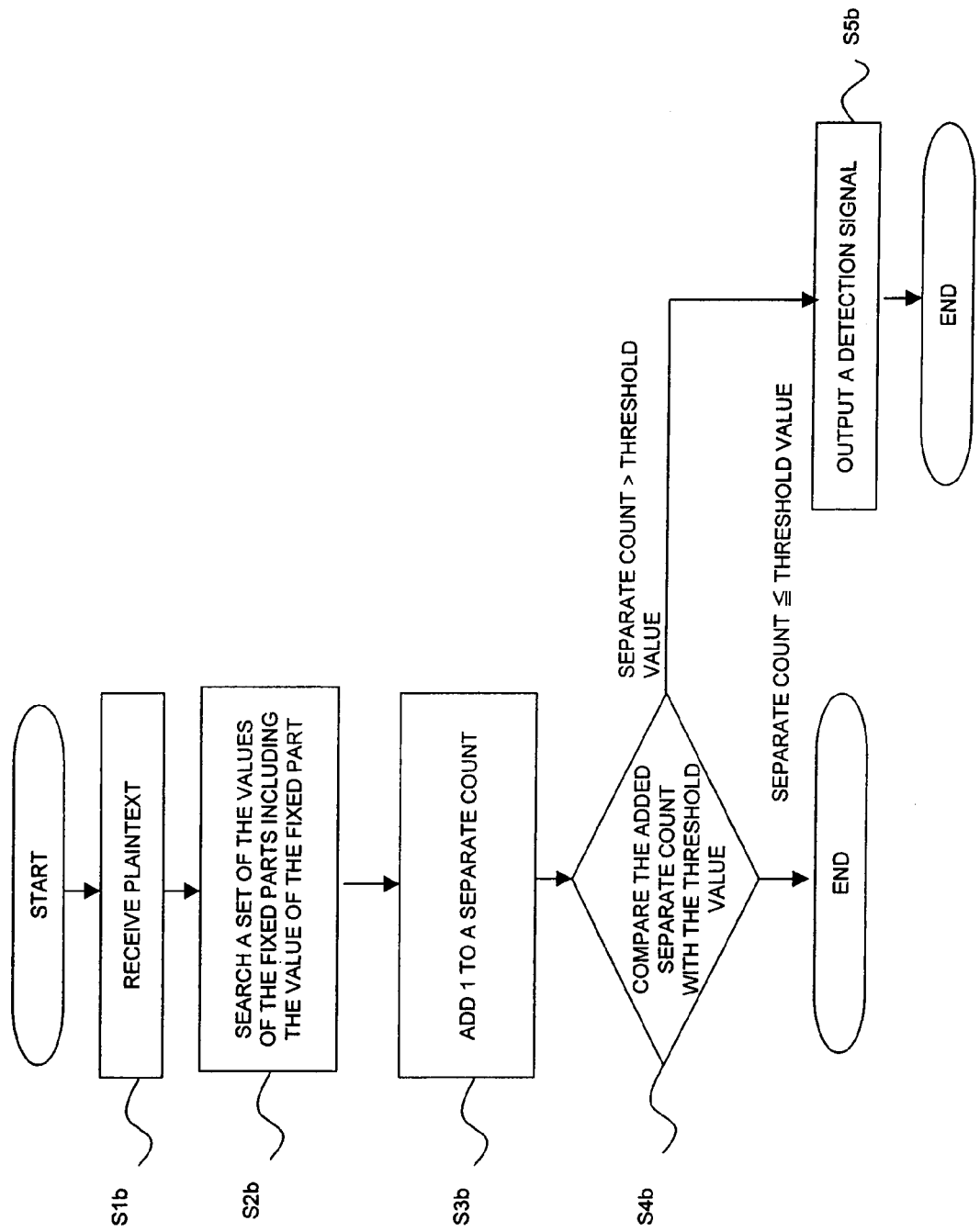
FIG. 10 is a flowchart illustrating an example of the operation of the particular plaintext detector of the embodiment.

Hereinafter, the operation of the filter apparatus F0 will be described with reference to a flowchart shown in FIG. 9 and a flowchart shown in FIG. 10 illustrating the operation of the particular plaintext detector D0.

The input port F11 receives a packet delivered to the filter apparatus F0 (S1a), and the input buffer F12 stores the packet in order of arrival (S2a). Subsequently, the processing part F13 splits the payload part of the packet being plaintext into 64 bits, and inputs it into the particular plaintext detector. At this time, when the payload part falls short of 64 bits, it can be changed in accordance with the form of utilizing KASUMI, such as the payload part of a logically subsequent packet in the buffer is pushed up for use, and padding is filled (S3a).

The particular plaintext detector D0 determines whether to detect particular plaintext (S4a). More specifically, the receiving part D1 receives plaintext (S1b), the counter part D2 searches a set of the values of the fixed parts including the value of the fixed part for 17th to 32nd bits of the plaintext (S2b), and adds 1 to the corresponding separate count (S3b).

Subsequently, the detecting part D3 determines by comparison whether the added separate count exceeds a threshold value that is the minimum number of plaintext required to facilitate decryption, $2^{48}$, in this case (S4b) The process of the particular plaintext detector D0 is finished when it does not exceed the threshold vale, whereas the process is finished after a detection signal is outputted when it exceeds the threshold value (S5b).

When the process is returned to the filter apparatus main body F1, the filter apparatus main body F1 checks whether the particular plaintext detector D0 receives the outputted detection signal (S5a).

When the processing part F13 does not receive the detection signal, it checks whether there is a packet that has finished processing the entire payload part (S6a). When there is the packet, it is transferred to the output buffer F14. When there is no packet, new plaintext is inputted into the particular plaintext detector.

The output buffer F14 stores the packet (S7a), and the output port F15 sends the packet to the router (S8a).

When the processing part F13 has received the detection signal, the processing part F13 outputs an acknowledgment signal to the encryption/decryption apparatus N7 (S9a), and waits until it receives a process restart signal (S10a).

At this time, the encryption/decryption apparatus N7 that has received the acknowledgment signal updates the key used in the cryptographic operations, or it takes an action to end the operations. When the action is completed, it outputs a process restart signal to the filter apparatus main body F0.

When the processing part F13 receives the process restart signal, it sends a reset signal to the particular plaintext detector D0 (S10a). When there is a packet that has finished processing the entire payload part, it transfers the packet to the output buffer F14.

The output buffer F14 stores the packet (S6a), and the output port F15 sends the packet to the router (S7a).

The router N3 having received the packet from the filter apparatus F0 sends it to the encryption/decryption apparatus N7, and the encryption/decryption apparatus N7 encrypts the payload part of the packet and sends it to the gateway N2.

The gateway N2 confirms the address of the user N1 described in the header part of the packet, and sends it to the Internet when the packet is proper.

The filter apparatus F0 provided with this particular plaintext detector D0 receives data, which has been outputted from an information processor such as the Web server N4, the application server N5 and the database server N6, as plaintext at the step before it is encrypted by the encryption/decryption apparatus N7, and then outputs the plaintext. Thus, the information processor gives a response that the user N1 can expect, or outputs data that can expect statistical bias. Therefore, the filter apparatus detects the event that ciphers can be decrypted easily, and temporarily suspends the output of plaintext to allow an action of changing the keys even though it can be considered that the user tries decryption by inputting plaintext. The difficulty in decrypting ciphers can be enhanced with performing cryptographic operations more efficiently than an action of changing the keys for given periods of time, for example.

In addition, the invention is not limited to the embodiment.

Figure 11:
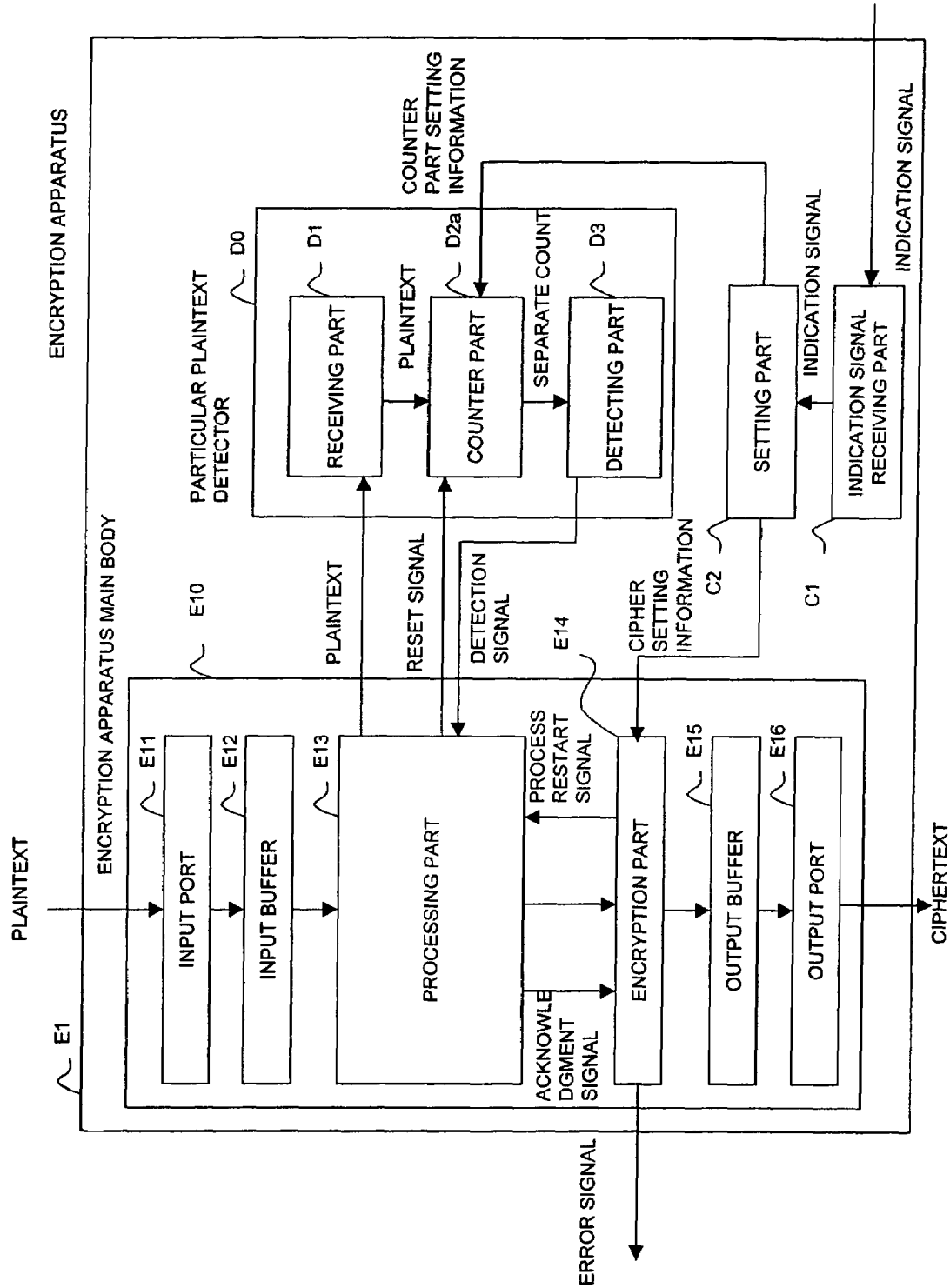
FIG. 11 is a function configuration diagram illustrating an encryption apparatus of another embodiment.

For example, as an apparatus for enhancing the difficulty in decrypting ciphertext with the use of the particular plaintext detector, an embodiment can be considered as an encryption apparatus shown in FIG. 11.

More specifically, an encryption apparatus E1 is configured to further have an encryption part E14 capable of executing a plurality of encryption algorithms for encryption; an indication signal receiving part C1 for receiving an indication signal to indicate an encryption algorithm for new use; and a setting part C2 for outputting information describing an encryption algorithm performed by the encryption part E14 and a fixed part used by a counter part D2 of a particular plaintext detector D0.

Hereinafter, each part will be described when configured as the encryption apparatus E1.

An input port E11, an input buffer E12, an output buffer E15, and an output port E16 included in an encryption apparatus main body E10 are the same as the input port F11, the input buffer F12, the output buffer F14, and the output port E15 included in the filter apparatus main body F1, respectively, but they are formed to output ciphertext.

A processing part E13 can output plaintext to the particular plaintext detector D0, receive a detection signal for indicating the detection of particular plaintext and a process restart signal for instructing the restart of a suspended process, output an acknowledgment signal for acknowledging the receipt of the detection signal, and transfer a packet in the input buffer E12 to the encryption part E14.

More specifically, it splits a payload part of a packet being plaintext into 64 bits, and sequentially inputs it into the particular plaintext detector D0. It inputs the entire plaintext contained in a certain packet into the particular plaintext detector D0, and it transfers the packet to the encryption part E14 when it does not receive a detection signal.

The encryption part E14 executes encryption algorithms, receives plaintext, and outputs ciphertext. It can receive an acknowledgment signal, and output a process restart signal. Moreover, it can execute procedures relating to cryptographic operations such as generating a packet to perform a procedure to clear cryptographic operations, in which encryption algorithms are changed by receiving cipher setting information.

A counter part D2a is configured in which the counter part D2 of the filter apparatus F0 can set the fixed part and a set of the values of the fixed parts based on counter part setting information.

The indication signal receiving part C1 receives an indication signal. The setting part C2 outputs cipher setting information for setting an encryption algorithm for new use in the encryption part E14 and counter part setting information for setting parameters about the fixed parts and a set of the values of the fixed parts unique to encryption algorithms set in the counter part D2a based on the indication signal.

Figure 12:
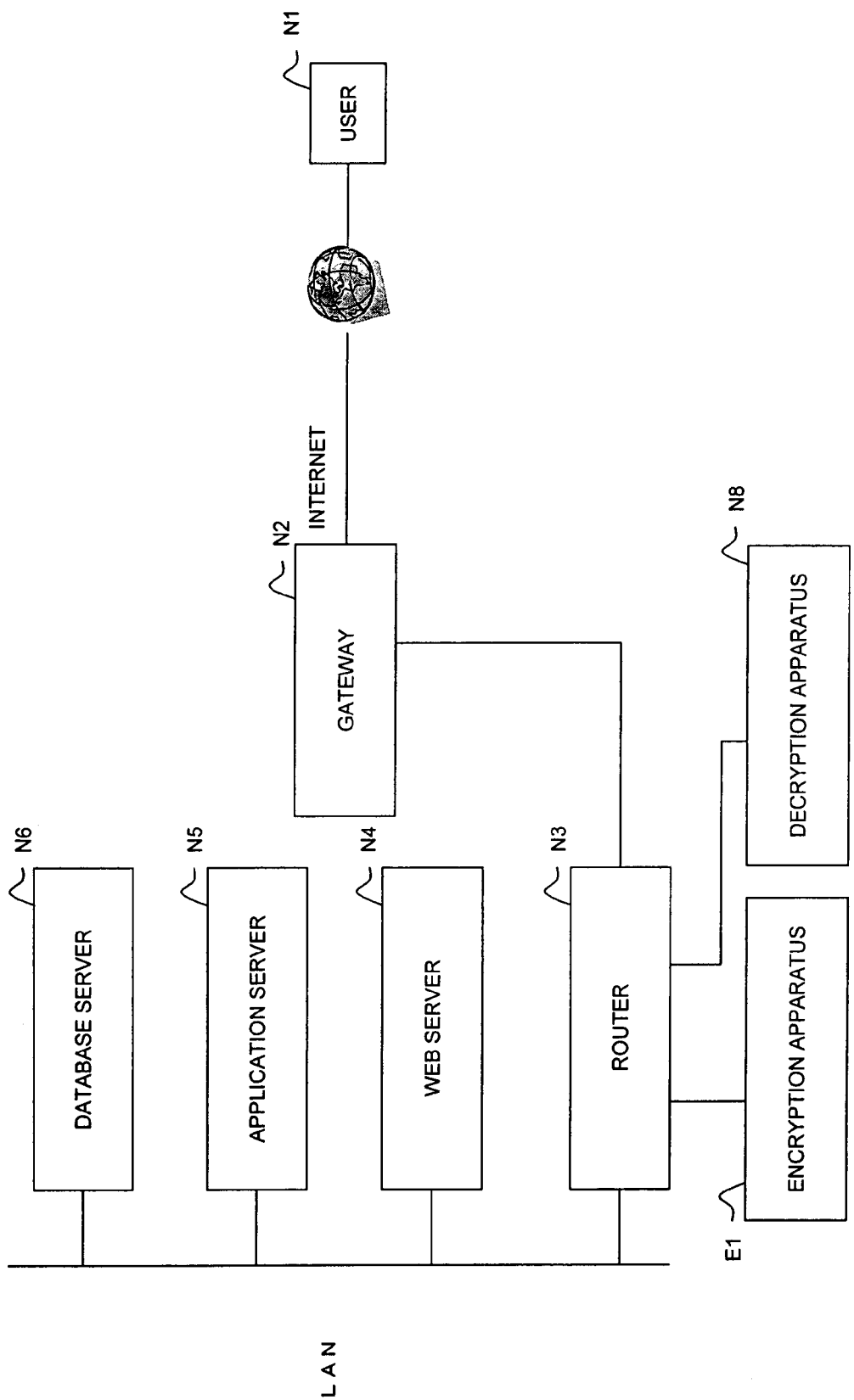
FIG. 12 is a network configuration diagram illustrating a network configuration suitable for using the encryption apparatus of another embodiment.

An example of the operation will be described below when the encryption apparatus E1 configured as the embodiment is connected to a network shown in FIG. 12 in order to provide services utilizing the World-wide Web for a user through the Internet.

First, when the user N1 sends an indication packet making a request for a change to a certain encryption algorithm in a state that cryptographic operations are established, the indication packet enters the gateway N2 to LAN through the Internet, and it is delivered to a decryption apparatus N8 by a router N3.

The decryption apparatus N8 decrypts the encrypted indication packet, and again returns it to the router N3. The router N3 sends the indication packet to the encryption apparatus E1 based on information set beforehand.

Figure 13:
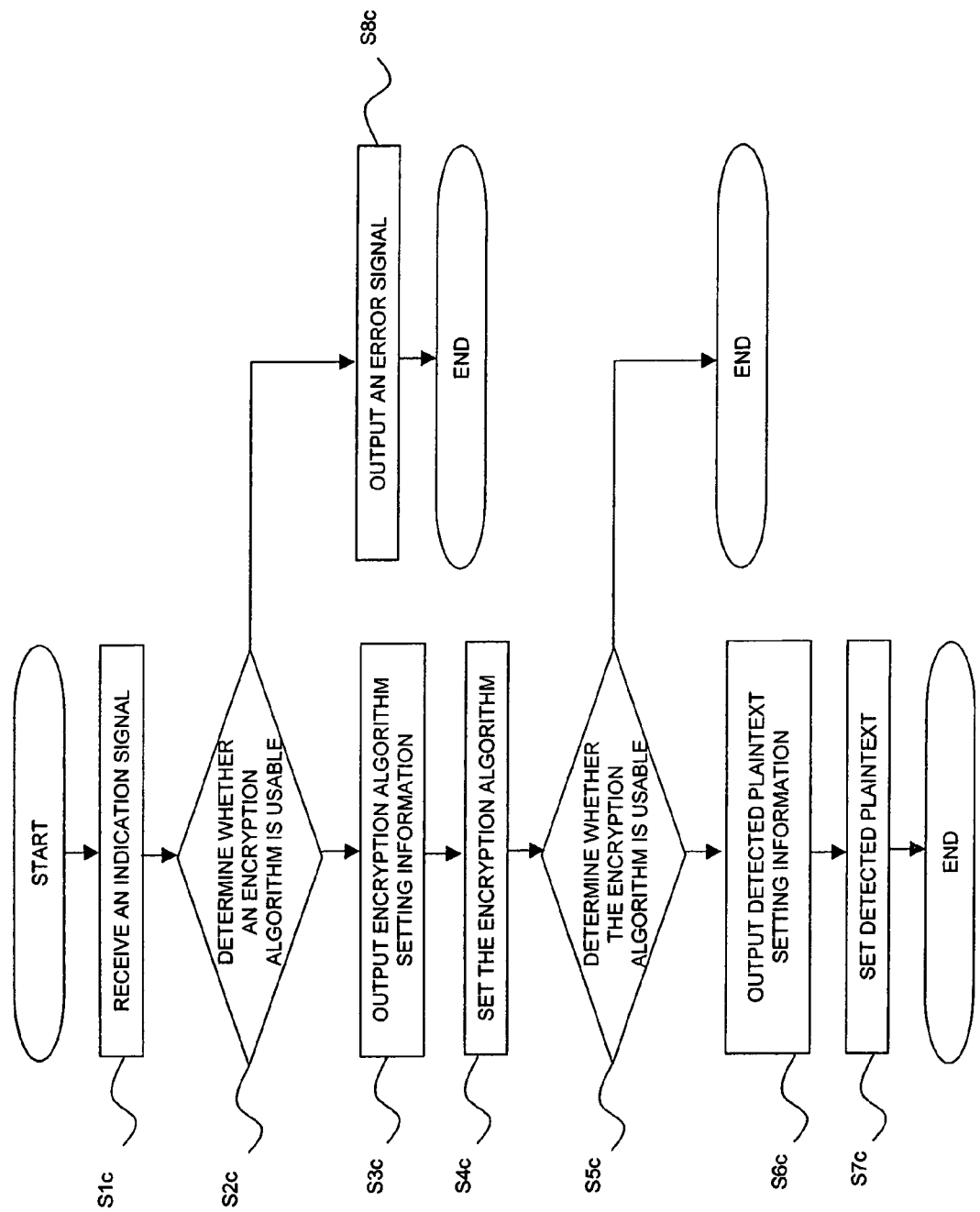
FIG. 13 is a flowchart illustrating an example of the operation of the encryption apparatus of another embodiment.

Hereinafter, the operation of the encryption apparatus E1 will be described with reference to a flowchart shown in FIG. 13.

First, an indication packet is delivered to the encryption apparatus E1, and the indication signal receiving part C1 receives it as an indication signal (S1c).

Subsequently, the setting part C2 determines whether the encryption algorithm indicated by the indication signal is usable (S2c), and it outputs cipher setting information when the algorithm is usable (S3c). The encryption part E14 performs setting so as to execute the indicated encryption algorithm (S4c). When the algorithm is unusable, the encryption part E14 outputs an error signal (S8c).

Then, the setting part C2 determines whether settings on a fixed part and a set of the values of the fixed parts corresponding to the indicated encryption algorithm are usable (S5c), and it outputs counter part setting information when it is usable (S6c). The counter part D2a sets the fixed part and the set of the values of the fixed parts (S7c).

When this is done, the encryption apparatus E1 can collectively manage encryption algorithms and information indicating the fixed parts unique to the encryption algorithms, and can keep the correspondences all the time. Therefore, there is no need to perform additional settings except to indicate encryption algorithms in changing encryption algorithms, which is particularly convenient when a service provider, for example, needs to change encryption algorithms frequently in accordance with users.

Figure 14:
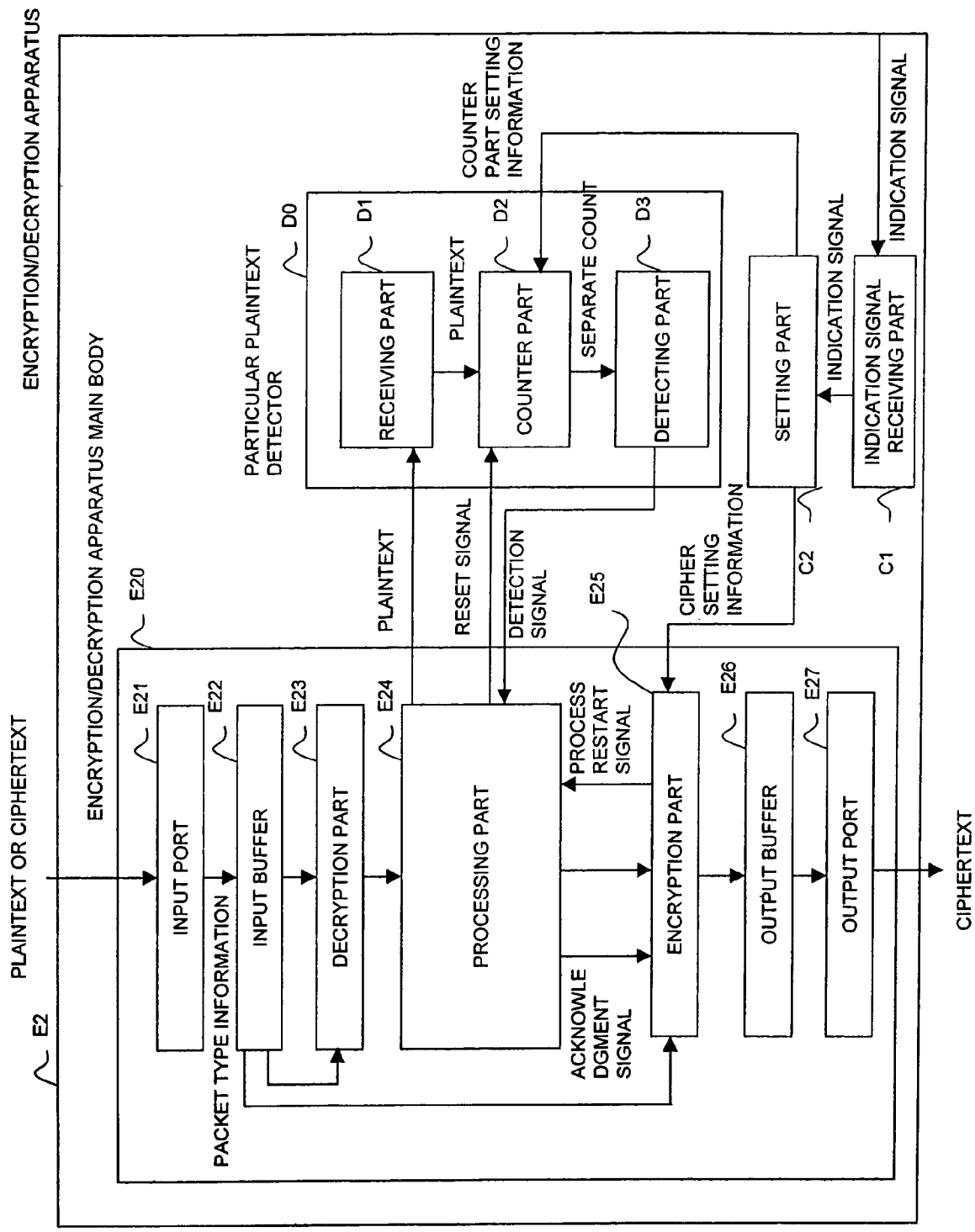
FIG. 14 is a function configuration diagram illustrating an encryption/decryption apparatus of still another embodiment.

Moreover, an embodiment can be considered as an encryption/decryption apparatus E2, in which a decryption part E23 is provided in the encryption apparatus E1 as shown in FIG. 14. Based on packet type information contained in the header part of a packet in an input buffer, the decryption part E23 outputs the packet as it is when the packet is plaintext, whereas it decrypts a packet and outputs plaintext when the packet is ciphertext. Based on the packet type information, an encryption part E25 encrypts a packet and outputs ciphertext when the packet is plaintext, whereas it outputs a packet as it is when the packet is ciphertext.

Figure 15:
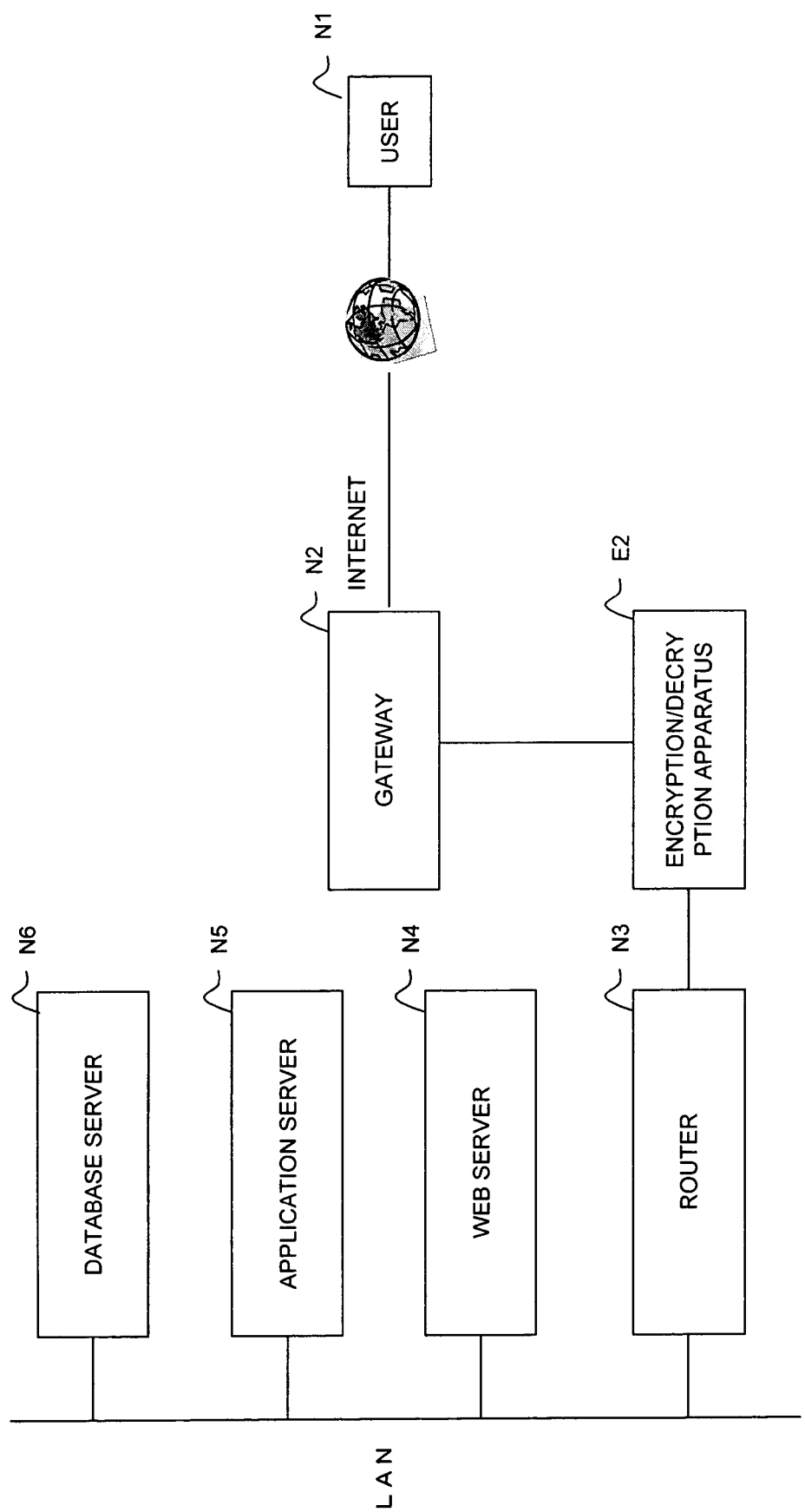
FIG. 15 is a network configuration diagram illustrating a network configuration suitable for using the encryption/decryption apparatus of still another embodiment.

The encryption/decryption apparatus E2 thus configured is connected to a network for use as shown in FIG. 15, for example, which allows the detection of particular plaintext contained in plaintext used by a person at the other end of communications. For example, it is convenient to enhance the difficulty in decrypting ciphertext by using common key cryptographic algorithms when a plurality of data senders uses the same keys to execute cryptographic operations.

In addition, as another embodiment of the encryption apparatus, an encryption apparatus is configured to automatically update keys, not to raise an alert to an operator to take an action when particular plaintext is detected. The encryption apparatus can provide not only labor savings and prompt action but also efficient communications compared with updating keys for given periods of time, and can enhance the difficulty of decryption.

Other than these embodiments, it can also be considered to use the particular plaintext detector in order to store ciphertext.

For example, ciphertext needs to be decrypted for searching for necessary information in stored ciphertext. Then, high-speed search can be done when ciphertext is stored along with a part of plaintext useful for search, but a code-breaker can use a pair of plaintext and ciphertext, which reduces the difficulty of decryption.

However, when there is no plaintext to facilitate decryption, the difficulty of decryption is not reduced even though ciphertext is stored along with a part of plaintext.

Thus, in the case of configuring a ciphertext storing apparatus, it includes an encryption apparatus, in which a part of plaintext useful for search, ciphertext, and key reference information for allowing reference of keys stored in a different file are stored in the same table or file, for example, which allows efficient search without reducing the difficulty of decryption.

FIG. 16 shows an example that plaintext is stored in a table of a ciphertext storing part in a ciphertext storing apparatus thus configured, and the correspondences between ciphertext and plaintext.

Furthermore, a plurality of small fixed parts is estimated even when the particular plaintext detector is used along with an encryption algorithm that is not determined which plaintext facilitates its decryption. In the case where separate counts have a distribution greatly different from a normal distribution, the particular plaintext detector assumes that decryption with plaintext is tried and sends a detection signal, which allows the further increased difficulty of decryption.

What is claimed is:

1. A particular plaintext detector for detecting whether each of a plurality of plaintexts to be inputted into a predetermined encryption algorithm satisfies a predetermined condition, the particular plaintext detector comprising:

a receiving part receiving the plurality of plaintexts sequentially;

a counter part separating a predetermined part from a bit string forming each of the plaintexts into a fixed part and a remaining part into a variable part, counting the number of inputted plaintexts each of which has the same value of the fixed part, and storing the number as a separate count; and a detecting part outputting a detection signal that shows the encryption algorithm is susceptible to decryption attack when at least one of the separate counts exceeds a predetermined number.

2. A particular plaintext detector for detecting whether each of a plurality of plaintexts, to be inputted into a block encryption algorithm, satisfies a predetermined condition, the block encryption algorithm receiving and stirring each of the plurality of plaintexts with a key step by step to perform encryption and outputting ciphertext, the particular plaintext detector comprising:

a receiving part receiving the plurality of plaintexts sequentially;

a counter part separating a predetermined part from a bit string forming each of the plaintexts into a fixed part and a remaining part into a variable part, counting the number of inputted plaintexts each of which has the same value of the fixed part, and storing the number as a separate count; and a detecting part outputting a detection signal that shows the encryption algorithm is susceptible to decryption attack when at least one of the separate counts exceeds a predetermined number.

3. A particular plaintext detector for detecting whether each of a plurality of plaintexts to be inputted into a KASUMI type encryption algorithm having a stirring step satisfies a predetermined condition, the KASUMI type encryption algorithm equal to KASUMI which is a block encryption algorithm that receives the plurality of plaintexts sequentially, has a plurality of stirring steps for stirring with a key, and performs encryption step by step to output ciphertext, the particular plaintext detector comprising:

a receiving part receiving the plurality of plaintexts sequentially;

a counter part separating $17^{th}$ to $32^{nd}$ bits of each of the plurality of plaintexts into a fixed part and $1^{st}$ to $16^{th}$ bits and $33^{rd}$ to $64^{th}$ bith thereof into a variable part, counting the number of inputted plaintexts each of which has the same value of the fixed part, and storing it as a separate count; and a detecting part outputting a detection signal that shows the encryption algorithm is susceptible to decryption attack when at least one of the separate counts exceeds a predetermined number.

4. A filter apparatus for limiting an output of ciphertext from an encryption algorithm that receives a plurality of plaintexts and outputs ciphertext, the filter apparatus comprising:

a receiving part receiving the plurality of plaintexts sequentially;

a counter part separating a predetermined part from a bit string forming each of the plaintexts into a fixed part and a remaining part into a variable part, counting the number of inputted plaintexts each of which has the same value of the fixed part, and storing it as a separate count; and a detecting part outputting a detection signal when at least one of the separate counts exceeds a predetermined number; and a filter apparatus main body outputting each of the plaintext when a detection signal is not outputted from the detecting part, and for holding the further output of each of the plurality of plaintexts until it receives a process restart signal for instructing a restart of outputting each of the plurality of plaintext when the detection signal that shows the encryption algorithm is susceptible to a decryption attack is outputted.

5. An encryption apparatus for executing an encryption algorithm that receives each of a plurality of plaintexts to output ciphertext in which the encryption algorithm is changeable, the encryption apparatus comprising:

a receiving part receiving the plurality of the plaintexts sequentially;

a counter part separating a predetermined part from a bit string forming each of the plaintexts into a fixed part and a remaining part into a variable part, counting the number of inputted plaintexts each of which has the same value of the fixed part, and storing the number as a separate count; and a detecting part outputting a detection signal that shows the encryption algorithm is susceptible to decryption attack when at least one of the separate counts exceeds a predetermined number;

an encryption apparatus main body performing the encryption algorithm for encryption of those plurality of plaintexts subject to the detecting part and the detection signal is not outputted from the detecting part, and for holding output of any plurality of plaintexts when the detection signal is outputted; an indication signal receiving part receiving an indication signal for indicating a change in the encryption algorithm for subsequent encryption; and a setting part outputting cipher setting information required for setting the encryption algorithm executed by the encryption apparatus main body and counter part setting information required for setting information corresponding to the encryption algorithm for the fixed part and the set of the values of the fixed parts and used by the counter part based on the indication signal, wherein the encryption apparatus main body and the counter part perform the settings based on the cipher setting information and the counter part setting information.

6. An encryption apparatus for executing an encryption algorithm that receives a plurality of plaintexts to calculate ciphertext with a key, the encryption apparatus comprising:

a receiving part receiving the plurality of the plaintexts sequentially;

a counter part separating a predetermined part from a bit string forming each of the plaintexts into a fixed part and a remaining part into a variable part, counting the number of inputted plaintexts each of which has the same value of the fixed part, and storing the number as a separate count; and a detecting part outputting a detection signal that shows the encryption algorithm is susceptible to decryption attack when at least one of the separate counts exceeds a predetermined number; and an encryption apparatus main body updating the key used for encryption when a detection signal is outputted from the detecting part.

7. A ciphertext storing apparatus for executing an encryption algorithm that receives a plurality of plaintexts to calculate ciphertext with a key, and storing the ciphertext, the ciphertext storing apparatus comprising:

a receiving part receiving the plurality of the plaintexts sequentially;

a counter part separating a predetermined part from a bit string forming each of the plaintexts into a fixed part and a remaining part into a variable part, counting the number of inputted plaintexts each of which has the same value of the fixed part, and storing the number as a separate count; and a detecting part outputting a detection signal that shows the encryption algorithm is susceptible to decryption attack when at least one of the separate counts exceeds a predetermined number; and a ciphertext storing part allowed to store ciphertext; and a ciphertext storing apparatus main body updating the key used for encryption when a detection signal is outputted from the detecting part, and for storing partially each of the plaintexts, the ciphertext, and key reference information allowing reference of the key having been used for encryption in the ciphertext storing part.

8. A filter apparatus for limiting output of ciphertext from a block encryption algorithm that receives and stirs each of a plurality of plaintexts with a key step by step to perform encryption and outputs ciphertext, the filter apparatus comprising:

a receiving part receiving the plurality of the plaintexts sequentially;

a counter part separating a predetermined part from a bit string forming each of the plaintexts into a fixed part and a remaining part into a variable part, counting the number of inputted plaintexts each of which has the same value of the fixed part, and storing the number as a separate count; and a detecting part outputting a detection signal that shows the encryption algorithm is susceptible to decryption attack when at least one of the separate counts exceeds a predetermined number; and a filter apparatus main body outputting each of the plaintext when a detection signal is not outputted from the detecting part, and for holding an output of each of the plurality of plaintexts until it receives a process restart signal for instructing a restart of outputting each of the held plurality of plaintext when the detection signal is outputted.

9. An encryption apparatus for executing a block encryption algorithm that receives and stirs each of the plurality of plaintexts with a key, step by step, to perform encryption and outputs ciphertext in which the encryption algorithm is changeable, the encryption apparatus comprising;

a receiving part receiving the plurality of the plaintexts sequentially;

a counter part separating a predetermined part from a bit string forming each of the plaintexts into a fixed part and a remaining part into a variable part, counting the number of inputted plaintexts each of which has the same value of the fixed part, and storing the number as a separate count; and a detecting part outputting a detection signal that shows the encryption algorithm is susceptible to decryption attack when at least one of the separate counts exceeds a predetermined number; and an encryption apparatus main body executing the encryption algorithm for encryption when a detection signal is not outputted from the detecting part, and for holding output of each of the plurality of plaintexts when the detection signal is outputted;

an indication signal receiving part receiving an indication signal for indicating a change in the encryption algorithm for subsequent encryption; and a setting part outputting cipher setting information required for setting the encryption algorithm executed by the encryption apparatus main body and counter part setting information for setting information corresponding to the encryption algorithm for the fixed part and the set of values of thefixed parts and used by the counter based on the indication signal, wherein the encryption apparatus main body and the counter part perform the settings based on the ciphertext setting information and the counter part setting information.

10. An encryption apparatus for executing a block encryption algorithm the receives and stirs each of a plurality of plaintexts with a key, step by step, to perform encryption and outputs ciphertext, the encryption apparatus comprising:
a receiving part receiving the plurality of the plaintexts sequentially;
a counter part separating a predetermined part from a bit string forming each of the plaintexts into a fixed part and a remaining part into a variable part, counting the number of inputted plaintexts each of which has the same value of the fixed part, and storing the number as a separate count; and
a detecting part outputting a detection signal that shows the encryption algorithm is susceptible to decryption attack when at least one of the separate counts exceeds a predetermined number; and
an encryption apparatus main body updating the key used for encryption when a detection signal is outputted from the detecting part.

11. A ciphertext storing apparatus for executing a block encryption algorithm that receives and stirs each of a plurality of plaintexts with a key, step by step, to perform encryption and outputs ciphertext, and storing the ciphertext, the ciphertext storing apparatus comprising:
a receiving part receiving the plurality of the plaintexts sequentially;
a counter part separating a predetermined part from a bit string forming each of the plaintexts into a fixed part and a remaining part into a variable part, counting the number of inputted plaintexts each of which has the same value of the fixed part, and storing the number as a separate count;
a detecting part outputting a detection signal that shows the encryption algorithm is susceptible to decryption attack when at least one of the separate counts exceeds a predetermined number;
a ciphertext storing part storing ciphertext; and
a ciphertext storing apparatus main body updating the key used for encryption when a detection signal is outputted from the detecting part, and for storing partially each of the plaintexts, the ciphertext, and key reference information allowing reference of the key having been used for encryption in the ciphertext storing part.

12. A filter apparatus for limiting an putput of ciphertext from a KASUMI type encryption algorithm having a stirring step, the KASUMI type encryption algorithm equal to KASUMI which is a block encryption algorithm that receives a plurality of plaintexts sequentially, has a plurality of stirring steps for stirring with a key, and performs encryption step by step to output ciphertext, the filter apparatus comprising:
a receiving part receiving the plurality of the plaintexts sequentially;
a counter part separating $17^{th}$ to $32^{nd}$ bits of each of the plurality of plaintexts into a fixed part and $1^{st}$ to $16^{th}$ bits and $33^{rd}$ to $64^{th}$ bith thereof into a variable part, counting the number of inputted plaintexts each of which has the same value of the fixed part, and storing it as a separate count;
a detecting part outputting a detection signal that shows the encryption algorithm is susceptible to decryption attack when at least one of the separate counts exceeds a predetermined number; and
a filter apparatus main body outputting each of the plaintext when a detection signal is not outputted from the detecting part, and for holding the further output of each of the plurality of plaintexts until it receives a process restart signal for instructing a restart of outputting each of the held plurality of plaintext when the detection signal is outputted.

13. An encryption apparatus for executing a KASUMI type encryption algorithm having a stirring step, the KASUMI type encryption algorithm equal to KASUMI which is a block encryption algorithm that receives a plurality of plaintexts sequentially, has a plurality of stirring steps for stirring with a key, and performs encryption step by step to output ciphertext in which the encryption algorithm is changeable, the encryption apparatus comprising:
a receiving part receiving the plurality of the plaintexts sequentially;
a counter part separating $17^{th}$ to $32^{nd}$ bits of each of the plurality of plaintexts into a fixed part and $1^{st}$ to $16^{th}$ bits and $33^{rd}$ to $64^{th}$ bith thereof into a variable part, counting the number of inputted plaintexts each of which has the same value of the fixed part, and storing it as a separate count;
a detecting part outputting a detection signal that shows the encryption algorithm is susceptible to decryption attack when at least one of the separate counts exceeds a predetermined number;
an encryption apparatus main body executing the encryption algorithm for encryption of those plurality of plaintexts subject to the detecting part and the detection signal is not outputted from the detecting part, and for holding an output of each of the plurality of plaintexts when the detection signal is outputted,
an indication signal receiving part receiving an indication signal for indicating a change in the encryption algorithm for subsequent encryption; and
a setting part outputting cipher setting information required for setting the encryption algorithm executed by the encryption apparatus main body and counter part setting information corresponding to the encryption algorithm for the fixed part and used by the counter part based on the indication signal,
wherein the encryption apparatus main body and the counter part perform the settings based on the ciphertext setting information and the counter part setting information.

14. An encryption apparatus for executing a KASUMI type encryption algorithm having a stirring step, the KASUMI type encryption algorithm equal to KASUMI which is a block encryption algorithm that receives a plurality of plaintexts sequentially, has a plurality of stirring steps for stirring with a key, and performs encryption step by step to output ciphertext, the encryption apparatus comprising:
- a receiving part receiving the plurality of the plaintexts sequentially;
- a counter part separating $17^{th}$ to $32^{nd}$ bits of each of the plurality of plaintexts into a fixed part and $1^{st}$ to $16^{th}$ bits and $33^{rd}$ to $64^{th}$ bith thereof into a variable part, counting the number of inputted plaintexts each of which has the same value of the fixed part, and storing it as a separate count;
- a detecting part outputting a detection signal that shows the encryption algorithm is susceptible to decryption attack when at least one of the separate counts exceeds a predetermined number;
- an encryption apparatus main body updating the key used for encryption when a detection signal is outputted from the detecting part.

15. A ciphertext storing apparatus for executing a KASUMI type encryption algorithm having a stirring step, the KASUMI type encryption algorithm equal to KASUMI which is a block encryption algorithm that receives a plurality of plaintexts sequentially, has a plurality of stirring steps for stirring with a key, and performs encryption step by step to output ciphertext, and storing the ciphertext, the ciphertext storing apparatus comprising:
- a receiving part receiving the plurality of the plaintexts sequentially;
- a counter part separating $17^{th}$ to $32^{nd}$ bits of each of the plurality of plaintexts into a fixed part and $1^{st}$ to $16^{th}$ bits and $33^{rd}$ to $64^{th}$ bith thereof into a variable part, counting the number of inputted plaintexts each of which has the same value of the fixed part, and storing it as a separate count;
- a detecting part outputting a detection signal that shows the encryption algorithm is susceptible to decryption attack when at least one of the separate counts exceeds a predetermined number;
- a ciphertext storing part allowed to store ciphertext; and
- a ciphertext storing apparatus main body updating the key used for encryption when a detection signal is outputted from the detecting part, and for storing partially each of the plaintexts, the ciphertext, and key reference information allowing reference of the key having been used for encryption in the ciphertext storing part.

16. A plaintext detector system for analyzing potential susceptibility for blocks of plaintext, to be encrypted by an encryption algorithm, of being decrypted by an unauthorized party and increasing the security of the encryption of such plaintext, comprising:
- a receiving unit receiving a block of plaintext to be encrypted;
- a counter unit connected to the receiving unit to separate, from the block of plaintext, a predetermined bit string, and to compute a value based on counting the predetermined bit string as virtually continuing bits to represent a susceptibility standard of unauthorized decryption; and
- a detecting unit comparing the computed value with a predetermined stored value wherein the block of plaintext is less than the susceptibility standard predetermined stored value is provided a first signal that will permit encryption and the block of plaintext that is equal or greater than the susceptibility standard predetermined stored value is provided a second signal to change a manner of execution of the encryption algorithm of the block of plaintext to increase security.

17. The plaintext detector system of claim 16 where the second signal enables a change of a key used by the encryption algorithm.

* * * * *